US011078104B2

(12) United States Patent
Gross et al.

(10) Patent No.: US 11,078,104 B2
(45) Date of Patent: Aug. 3, 2021

(54) THERMAL HISTORY-INSENSITIVE, ALKALI-CONTAINING GLASSES

(71) Applicant: CORNING INCORPORATED, Corning, NY (US)

(72) Inventors: Timothy Michael Gross, Corning, NY (US); Alexandra Lai Ching Kao Andrews Mitchell, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 255 days.

(21) Appl. No.: 16/185,601

(22) Filed: Nov. 9, 2018

(65) Prior Publication Data

US 2019/0152836 A1 May 23, 2019

Related U.S. Application Data

(60) Provisional application No. 62/587,863, filed on Nov. 17, 2017.

(51) Int. Cl.
| | |
|---|---|
| *C03C 3/083* | (2006.01) |
| *C03C 3/085* | (2006.01) |
| *C03C 21/00* | (2006.01) |
| *C03C 3/091* | (2006.01) |
| *C03C 10/00* | (2006.01) |
| *B32B 17/06* | (2006.01) |
| *G06F 1/16* | (2006.01) |

(52) U.S. Cl.
CPC .............. *C03C 3/083* (2013.01); *B32B 17/06* (2013.01); *C03C 3/091* (2013.01); *C03C 10/0018* (2013.01); *C03C 10/0027* (2013.01); *C03C 21/002* (2013.01); *G06F 1/1626* (2013.01); *G06F 1/1656* (2013.01); *B32B 2457/20* (2013.01); *G06F 2200/1634* (2013.01)

(58) Field of Classification Search
CPC ......... C03C 3/083; C03C 3/085; C03C 3/087; C03C 21/002
See application file for complete search history.

(56) References Cited

U.S. PATENT DOCUMENTS

| | | |
|---|---|---|
| 2010/0035745 A1 | 2/2010 | Murata |
| 2011/0045961 A1 | 2/2011 | Dejneka et al. |
| 2016/0102011 A1 | 4/2016 | Hu et al. |

FOREIGN PATENT DOCUMENTS

| | | | |
|---|---|---|---|
| DE | 10351885 A1 * | 5/2004 | ............. A61K 6/827 |
| DE | 10351885 A1 | 5/2004 | |
| JP | 2006290704 A | 10/2006 | |

OTHER PUBLICATIONS

International Search Report and Written Opinion PCT/US2018/061490 dated Apr. 11, 2019, 18 Pgs.
Gross et al. "A glass with high crack initiation load: role of fictive temperature-independent mechanical properties." Journal of Non-Crystalline Solids, 355(9), pp. 563-568, 2009.
Gross et al. "Fictive temperature-independent density and minimum indentation size effect in calcium aluminosilicate glass." Journal of Applied Physics, 104(6), 063529, 11 Pgs. 2008.

* cited by examiner

*Primary Examiner* — Elizabeth A. Bolden
(74) *Attorney, Agent, or Firm* — Kevin M. Johnson

(57) ABSTRACT

A glass composition includes greater than or equal to 69.0 mol % $SiO_2$, greater than or equal to 7.0 mol % $Al_2O_3$, greater than or equal to 14.0 mol % $R_2O$, and an absolute value of a slope of a line extending between a first endpoint and a second endpoint less than or equal to |0.020|. The first endpoint is a Young's modulus at a fictive temperature of the annealing point temperature and the second endpoint is a Young's modulus at a fictive temperature of the strain point temperature, and the slope is a change in Young's modulus (GPa) per 1° C. change in fictive temperature. $R_2O$ is a total amount of alkali metal oxides and includes at least two alkali metal oxides. A glass article and consumer electronic product are also disclosed.

21 Claims, 3 Drawing Sheets

THERMAL HISTORY-INSENSITIVE, ALKALI-CONTAINING GLASSES

CROSS-REFERENCE TO RELATED APPLICATIONS

This application claims the benefit of priority of U.S. Provisional Application Ser. No. 62/587,863 filed on Nov. 17, 2017, the contents of which are relied upon and incorporated herein by reference in their entirety.

BACKGROUND

Field

The present specification generally relates to glass compositions suitable for use as cover glass for electronic devices. More specifically, the present specification is directed to alkali-containing glasses that are thermal history insensitive and that may be formed into cover glass for electronic devices.

Technical Background

Portable electronic devices, such as, smartphones, tablets, and wearable devices (such as, for example, watches and fitness trackers) continue to get smaller and more complex. As such, display glasses that are conventionally used on at least one external surface of such portable electronic devices also continue to get more complex. For instance, as portable electronic devices get smaller and thinner to meet consumer demand, the display glasses used in these portable electronic devices also gets smaller and thinner, which results in lower tolerances for variations in the dimensions and quality of the display glasses. Similarly, tolerances for variations in properties of the display glass, such as, for example strength, density, and elasticity also diminish with the size of the portable electronic device. Unfortunately, the dimensions and properties of glasses used as display glasses can change as the glass is cooled and finished, which can lead to glasses that meet specifications for portable electronic devices before cooling or finishing, but that do not meet the specifications for portable electronic devises after cooling or finishing.

Accordingly, a need exists for glasses that maintain their dimensions and properties regardless of the thermal history of the glass.

SUMMARY

According to a first embodiment, a glass composition comprises: greater than or equal to 69.0 mol % $SiO_2$; greater than or equal to 7.0 mol % $Al_2O_3$; greater than or equal to 14.0 mol % $R_2O$; and an absolute value of a slope of a line extending between a first endpoint and a second endpoint less than or equal to |0.020|. The first endpoint is a Young's modulus at a fictive temperature of the annealing point temperature and the second endpoint is a Young's modulus at a fictive temperature of the strain point temperature, and the slope is a change in Young's modulus (GPa) per 1° C. change in fictive temperature. $R_2O$ is a total amount of alkali metal oxides and comprises at least two alkali metal oxides.

According to a second embodiment, a glass article comprises: a first surface; a second surface; a central region positioned between the first surface and the second surface; and a compressive stress layer extending from at least one of the first surface and the second surface into the central region of the glass article. The glass article is formed from a glass composition comprising: greater than or equal to 69.0 mol % $SiO_2$; greater than or equal to 7.0 mol % $Al_2O_3$; greater than or equal to 14.0 mol % $R_2O$; and an absolute value of a slope of a line extending between a first endpoint and a second endpoint less than or equal to |0.020|. The first endpoint is a Young's modulus at a fictive temperature of the annealing point temperature and the second endpoint is a Young's modulus at a fictive temperature of the strain point temperature, and the slope is a change in Young's modulus (GPa) per 1° C. change in fictive temperature. $R_2O$ is a total amount of alkali metal oxides and comprises at least two alkali metal oxides.

According to a third embodiment, a consumer electronic product, comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display. At least a portion of the housing or the cover substrate comprises a first surface; a second surface; a central region positioned between the first surface and the second surface; and a compressive stress layer extending from at least one of the first surface and the second surface into the central region of the glass article. The glass article is formed from a glass composition comprising: greater than or equal to 69.0 mol % $SiO_2$; greater than or equal to 7.0 mol % $Al_2O_3$; greater than or equal to 14.0 mol % $R_2O$; and an absolute value of a slope of a line extending between a first endpoint and a second endpoint less than or equal to |0.020|. The first endpoint is a Young's modulus at a fictive temperature of the annealing point temperature and the second endpoint is a Young's modulus at a fictive temperature of the strain point temperature, and the slope is a change in Young's modulus (GPa) per 1° C. change in fictive temperature. $R_2O$ is a total amount of alkali metal oxides and comprises at least two alkali metal oxides.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, serve to explain the principles and operations of the claimed subject matter.

DETAILED DESCRIPTION

Figure 1:
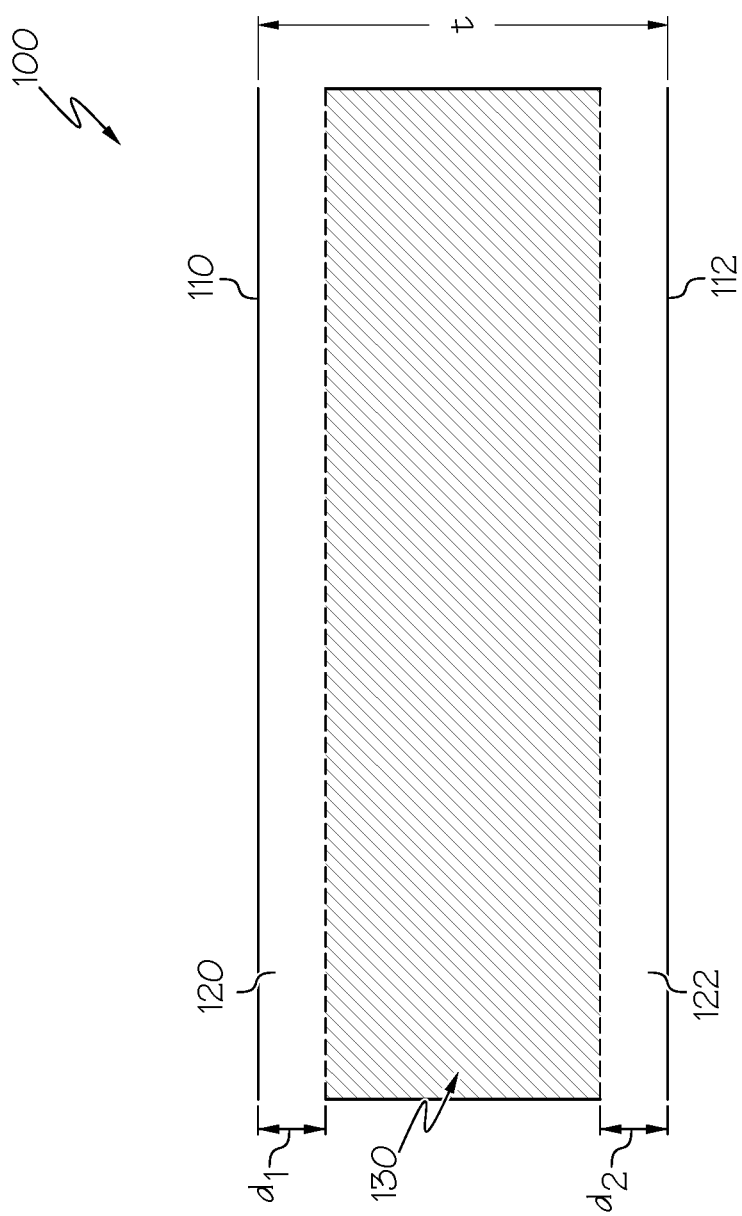
FIG. 1 schematically depicts a cross section of a glass having compressive stress layers on surfaces thereof according to embodiments disclosed and described herein.

Reference will now be made in detail to alkali-containing glasses according to various embodiments. In particular, alkali-containing aluminosilicate glasses have good ion exchangeability, and chemical strengthening processes have been used to achieve high strength and high toughness properties in alkali aluminosilicate glasses. Therefore, alkali-containing aluminosilicate glasses with good physical properties, chemical durability, and ion exchangeability have drawn attention for use as cover glasses for displays.

However, various properties of glasses can change depending on the manufacturing method used to produce the glass. For instance, properties of a glass made in small amounts during research and development can be significantly different than the properties of the same glass made at a production scale. Likewise, the manufacturing methods used even at production scale can vary widely, which can cause the properties of glasses with similar compositions to vary depending on the manufacturing method used to manufacture the glass. Without being bound by any particular theory, it is believed that the cooling rate that a glass experiences—which can affect the glass' final properties and structure—changes based on the manufacturing method from crucible melts to research-scale melters to production-scale tanks. Because of this, significant effort is required to reproduce the thermal history that glasses undergo during production at smaller scales in order to design ion-exchange schedules and theoretically determine the properties of the production-scale glasses. However, the thermal history insensitive glasses according to embodiments disclosed and described herein maintain their properties across differing manufacturing platforms, making forming and other post-processing, such as, for example, ion exchange, easier and more predictable compared to glasses that are sensitive to thermal history.

Not only are glass structures and properties susceptible to change as a function of the glasses cooling rates, but they can also be affected by high temperature post processing steps, such as, for example, thin film transistor deposition on display glass. Small amounts of compaction of glasses that undergo high temperature processes can affect the outcome of the post processing. In the case of display glass, the electronics circuit pattern and glass substrate can become mismatched, and it is necessary to make process adjustments and corrections, which can be difficult and may not completely solve the problem. Accordingly, whether it is to maintain properties during the initial glass formation or to eliminate changes in properties during post-processing, there is a demonstrated need for glasses with thermal history insensitive structure and properties. The thermal history insensitive alkali-containing glasses disclosed and described herein provide glasses with such stable structure and properties.

Physical properties of the alkali-containing glass compositions as disclosed above will now be discussed. These physical properties can be achieved by modifying the component amounts of the alkali-containing glass composition, as will be discussed in more detail with reference to the examples.

The fictive temperature is a parameter for characterizing the structure and properties of a glass. The cooling rate from the melt affects the fictive temperature. The faster the cooling rate, the higher the fictive temperature. For many glasses, properties such as Young's modulus, shear modulus, refractive index, and density decrease with increasing fictive temperature. The rate of change in these properties with fictive temperature depends on glass composition. The fictive temperature of the glass can be set by holding the glass at a given temperature in the glass transition range. The minimum time required to reset the fictive temperature is approximated by 30*((the viscosity of the glass at the heat treatment temperature)/shear modulus). To ensure full relaxation to the new fictive temperature, glasses may be held at times far exceeding 30*((the viscosity of the glass at the heat treatment temperature)/shear modulus).

As fictive temperature decreases, certain glasses (such as, for example, soda-lime silicates) exhibit increasing density, hardness, elastic modulus, and refractive index. For these glasses, the structure of the glass resembles the open structure of the melt upon fast cooling (high fictive temperature), but it compacts to a denser structure closer to a solid upon slow cooling (low fictive temperature). Other types of glasses (such as, for example, glasses of $SiO_2$) exhibit the opposite property trends: decreasing density, hardness, elastic modulus, and refractive index as a function of decreasing fictive temperature. The opposing trends exhibited by these different types of glasses are used to define glass compositions that have properties that are insensitive to thermal history (also referred to herein as "fictive-temperature independent").

Fictive-temperature independent glasses can be melted using conventional techniques and have properties that do not change (or change very little) as function of thermal history. Glasses with thermally stable properties are valuable for any products that require high temperature post-processing as the glass will not shrink when exposed to high temperature.

According to embodiments, the sensitivity of the glass to its thermal history may be measured by a comparison between the Young's modulus of the glass with the fictive temperature set to the annealing point temperature (referred to herein as the "first endpoint") and the Young's modulus of the glass with the fictive temperature set to the strain point temperature (referred to herein as the "second endpoint"). It should be understood that glasses with lower sensitivity to their thermal history will have a Young's modulus at the first endpoint that is similar to the Young's modulus at the second endpoint, because this shows that Young's modulus is not significantly affected by the thermal history of the glass. Thus, the sensitivity of the glass composition to its thermal history may be determined by the slope of a line between the first endpoint and the second endpoint. In such embodiments, the slope may be defined as the change in Young's modulus (GPa) per 1° C. change in fictive temperature. Particularly, the closer the slope of such a line gets to 0.0, the less sensitive the glass is to its thermal history. This function is absolute and it does not matter whether the slope of a line extending between the first endpoint and the second endpoint is positive or negative. For example, when the Young's modulus of a glass is measured at the first endpoint and the second endpoint, and a line extending between the first endpoint and the second endpoint has a slope of 0.02, the sensitivity of the glass to its thermal history will be about the same as the sensitivity of a glass where a line extending between the first endpoint and the second endpoint and having a slope of −0.02. Thus, in embodiments the slope of the glass is considered as an absolute value.

Young's modulus is used as the first endpoint and the second endpoint to determine a glass' sensitivity to its thermal history because Young's modulus can be measured with good accuracy, such as by using the method described below for measuring Young's modulus. In embodiments, the absolute value of a slope of a line extending between the first endpoint and the second endpoint is less than or equal to |0.020|, such as less than or equal to |0.019|, less than or equal to |0.018|, less than or equal to |0.017|, less than or equal to |0.016|, less than or equal to |0.015|, less than or equal to |0.014|, less than or equal to |0.013|, less than or equal to |0.012|, less than or equal to |0.01|, less than or equal to |0.010|, less than or equal to |0.009|, less than or equal to |0.008|, less than or equal to |0.007|, less than or equal to |0.006|, less than or equal to |0.005|, less than or equal to |0.004|, less than or equal to |0.003|, less than or equal to |0.002|, or less than or equal to |0.001|. It should be understood that for each of the above values, the absolute value of the slope of a line extending between the first endpoint and the second endpoint is greater than or equal to |0.000|. Without being bound by any particular theory, it is believed that glasses where an absolute value of a slope of a line extending between the first endpoint and the second endpoint is less than or equal to |0.020| are particularly useful because the volume of such glasses do not change, regardless of the manufacturing methods and conditions used to manufacture the glass. It is believed, again without being bound by any particular theory, that glasses comprising high amounts of silica, and possibly other tetrahedral units, and at least two alkali metal oxides are likely to be insensitive to their thermal histories and, thus, may be more likely to have an absolute value of a slope of a line extending between the first endpoint and the second endpoint is less than or equal to |0.020|. Glass compositions that meet these requirements are described below. As utilized herein, where a range of a numerical value of a slope is indicated to be an absolute value by vertical bars, the range refers to the absolute value of the slope. For example, where a slope is indicated as "less than or equal to |0.020|" the expression refers to the absolute value of the slope, such that a slope in the range from −0.020 to 0.020 is included.

Glass compositions according to embodiments may have a density, regardless of fictive temperature, from greater than or equal to 2.20 g/cm$^3$ to less than or equal to 2.60 g/cm$^3$, such as from greater than or equal to 2.25 g/cm$^3$ to less than or equal to 2.60 g/cm$^3$, or from greater than or equal to 2.30 g/cm$^3$ to less than or equal to 2.60 g/cm$^3$, from greater than or equal to 2.35 g/cm$^3$ to less than or equal to 2.60 g/cm$^3$, from greater than or equal to 2.40 g/cm$^3$ to less than or equal to 2.60 g/cm$^3$, or from greater than or equal to 2.45 g/cm$^3$ to less than or equal to 2.60 g/cm$^3$. In other embodiments, the glass composition may have a density from greater than or equal to 2.20 g/cm$^3$ to less than or equal to 2.45 g/cm$^3$, from greater than or equal to 2.20 g/cm$^3$ to less than or equal to 2.40 g/cm$^3$, from greater than or equal to 2.20 g/cm$^3$ to less than or equal to 2.35 g/cm$^3$, from greater than or equal to 2.20 g/cm$^3$ to less than or equal to 2.30 g/cm$^3$, or from greater than or equal to 2.20 g/cm$^3$ to less than or equal to 2.25 g/cm$^3$, and all ranges and sub-ranges between the foregoing values. The density values recited in this disclosure refer to a value as measured by the buoyancy method of ASTM C693-93 (2013).

Glass compositions according to embodiments may have a coefficient of thermal expansion (CTE), regardless of fictive temperature, from greater than or equal to 65×10$^{-7}$/° C. to less than or equal to 105×10$^{-7}$/° C., such as from greater than or equal to 70×10$^{-7}$/° C. to less than or equal to 100×10$^{-7}$/° C., from greater than or equal to 75×10$^{-7}$/° C. to less than or equal to 95×10$^{-7}$/° C., or from greater than or equal to 80×10$^{-7}$/° C. to less than or equal to 90×10$^{-7}$/° C., and all ranges and sub-ranges between the foregoing values. The CTE was measured over the temperature range from 0° C. to 300° C. and is expressed in terms of ppm/° C. and was determined using a push-rod dilatometer in accordance with ASTM E228-11.

Glass compositions according to embodiments may have a Young's modulus, regardless of fictive temperature, from greater than or equal to 60.0 GPa to less than or equal to 80.0 GPa, such as from greater than or equal to 62.0 GPa to less than or equal to 78.0 GPa, from greater than or equal to 64.0 GPa to less than or equal to 76.0 GPa, from greater than or equal to 66.0 GPa to less than or equal to 74.0 GPa, or from greater than or equal to 68.0 GPa to less than or equal to 72.0 GPa, and all ranges and sub-ranges between the foregoing values. The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

According to one or more embodiments, the glass composition may have a Poisson's ratio, regardless of fictive temperature, from greater than or equal to 0.185 to less than or equal to 0.220, such as from greater than or equal to 0.190 to less than or equal to 0.215, from greater than or equal to 0.195 to less than or equal to 0.210, or from greater than or equal to 0.200 to less than or equal to 0.205, and all ranges and sub-ranges between the foregoing values. The Poisson's ratio values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In embodiments, the glass composition may have a shear modulus, regardless of fictive temperature, from greater than or equal to 27.0 GPa to less than or equal to 33.0 GPa, such as from greater than or equal to 27.5 GPa to less than or equal to 32.5 GPa, from greater than or equal to 28.0 GPa to less than or equal to 32.0 GPa, from greater than or equal to 28.5 GPa to less than or equal to 31.5 GPa, from greater than or equal to 29.0 GPa to less than or equal to 31.0 GPa, or from greater than or equal to 29.5 GPa to less than or equal to 30.5 GPa, and all ranges and sub-ranges between the foregoing values. The shear modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

The glass composition may, in one or more embodiments, have a strain point, regardless of fictive temperature, from greater than or equal to 440° C. to less than or equal to 535° C., such as from greater than or equal to 445° C. to less than or equal to 530° C., from greater than or equal to 450° C. to less than or equal to 525° C., from greater than or equal to 455° C. to less than or equal to 520° C., from greater than or equal to 460° C. to less than or equal to 515° C., from greater than or equal to 465° C. to less than or equal to 510° C., from greater than or equal to 470° C. to less than or equal to 505° C., from greater than or equal to 475° C. to less than or equal to 500° C., from greater than or equal to 480° C. to less than or equal to 495° C., or from greater than or equal to 485° C. to less than or equal to 490° C., and all ranges and sub-ranges between the foregoing values. The strain point was determined using the beam bending viscosity method of ASTM C598-93 (2013).

In embodiments, the glass composition may have an annealing point, regardless of fictive temperature, from greater than or equal to 480° C. to less than or equal to 590° C., such as from greater than or equal to 485° C. to less than or equal to 585° C., from greater than or equal to 490° C. to less than or equal to 580° C., from greater than or equal to 495° C. to less than or equal to 575° C., from greater than or equal to 500° C. to less than or equal to 570° C., from greater than or equal to 505° C. to less than or equal to 565° C., from greater than or equal to 510° C. to less than or equal to 560° C., from greater than or equal to 515° C. to less than or equal to 555° C., from greater than or equal to 520° C. to less than or equal to 550° C., from greater than or equal to 525° C. to less than or equal to 545° C., or from greater than or equal to 530° C. to less than or equal to 540° C., and all ranges and sub-ranges between the foregoing values. The annealing point was determined using the beam bending viscosity method of ASTM C598-93 (2013).

The glass composition may, according to embodiments, have a softening point, regardless of fictive temperature, from greater than or equal to 700° C. to less than or equal to 870° C., such as from greater than or equal to 705° C. to less than or equal to 865° C., from greater than or equal to 710° C. to less than or equal to 860° C., from greater than or equal to 715° C. to less than or equal to 855° C., from greater than or equal to 720° C. to less than or equal to 850° C., from greater than or equal to 725° C. to less than or equal to 845° C., from greater than or equal to 730° C. to less than or equal to 840° C., from greater than or equal to 735° C. to less than or equal to 835° C., from greater than or equal to 740° C. to less than or equal to 830° C., from greater than or equal to 745° C. to less than or equal to 825° C., from greater than or equal to 750° C. to less than or equal to 820° C., from greater than or equal to 755° C. to less than or equal to 815° C., from greater than or equal to 760° C. to less than or equal to 810° C., from greater than or equal to 765° C. to less than or equal to 805° C., from greater than or equal to 770° C. to less than or equal to 800° C., from greater than or equal to 775° C. to less than or equal to 795° C., or from greater than or equal to 780° C. to less than or equal to 790° C., and all ranges and sub-ranges between the foregoing values. The softening point was determined using the parallel plate viscosity method of ASTM C1351M-96 (2012).

Alkali-containing glass compositions that are thermal history insensitive will now be described. In embodiments of glass compositions described herein, the concentration of constituent components (e.g., $SiO_2$, $Al_2O_3$, $Li_2O$, $Na_2O$ and the like) are given in mole percent (mol %) on an oxide basis, unless otherwise specified. Components of the thermal history insensitive alkali-containing glass composition according to embodiments are discussed individually below. It should be understood that any of the variously recited ranges of one component may be individually combined with any of the variously recited ranges for any other component.

In embodiments of the thermal history insensitive alkali-containing glass compositions disclosed herein, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In embodiments, the glass composition generally comprises $SiO_2$ in an amount greater than or equal to 69.0 mol %, such as greater than or equal to 70.0 mol %, greater than or equal to 71.0 mol %, greater than or equal to 72.0 mol %, greater than or equal to 73.0 mol %, greater than or equal to 74.0 mol %, greater than or equal to 75.0 mol %, greater than or equal to 76.0 mol %, greater than or equal to 77.0 mol %, greater than or equal to 78.0 mol %, greater than or equal to 79.0 mol %, or greater than or equal to 80.0 mol %. In embodiments, the glass composition comprises $SiO_2$ in amounts less than or equal to 82.0 mol %, less than or equal to 81.0 mol %, less than or equal to 80.0 mol %, less than or equal to 79.0 mol %, less than or equal to 78.0 mol %, less than or equal to 77.0 mol %, less than or equal to 76.0 mol %, less than or equal to 75.0 mol %, less than or equal to 74.0 mol %, less than or equal to 73.0 mol %, less than or equal to 72.0 mol %, less than or equal to 71.0 mol %, or less than or equal to 70.0 mol %. It should be understood that, in embodiments, any of the above ranges may be combined with any other range. However, in other embodiments, the glass composition comprises $SiO_2$ in an amount from greater than or equal to 69.0 mol % to less than or equal to 82.0 mol %, from greater than or equal to 70.0 mol % to less than or equal to 81.0 mol %, from greater than or equal to 71.0 mol % to less than or equal to 80.0 mol %, from greater than or equal to 72.0 mol % to less than or equal to 79.0 mol %, from greater than or equal to 73.0 mol % to less than or equal to 78.0 mol %, or from greater than or equal to 74.0 mol % to less than or equal to 77.0 mol %, and all ranges and sub-ranges between the foregoing values. In one or more embodiments, the glass composition comprises $SiO_2$ in amounts from greater than or equal to 70.0 mol % to less than or equal to 75.0 mol %, and all ranges and sub-ranges between the foregoing values.

The glass composition of embodiments may further comprise $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. In embodiments, the glass composition generally comprises $Al_2O_3$ in a concentration of greater than or equal to 7.0 mol %, such as greater than or equal to 8.0 mol %, greater than or equal to 9.0 mol %, greater than or equal to 10.0 mol %, greater than or equal to 11.0 mol %, greater than or equal to 12.0 mol %, greater than or equal to 13.0 mol %, greater than or equal to 14.0 mol %, greater than or equal to 15.0 mol %, greater than or equal to 16.0 mol %, or greater than or equal to 17.0 mol %. In embodiments, the glass composition comprises $Al_2O_3$ in amounts less than or equal to 18.0 mol %, less than or equal to 17.0 mol %, less than or equal to 16.0 mol %, less than or equal to 15.0 mol %, less than or equal to 14.0 mol %, less than or equal to 13.0 mol %, less than or equal to 12.0 mol %, less than or equal to 11.0 mol %, less than or equal to 10.0 mol %, less than or equal to 9.0 mol %, or less than or equal to 8.0 mol %. It should be understood that, in embodiments, any of the above ranges may be combined with any other range. However, in other embodiments, the glass composition comprises $Al_2O_3$ in an amount from greater than or equal to 7.0 mol % to less than or equal to 18.0 mol %, such as from greater than or equal to 8.0 mol % to less than or equal to 17.0 mol %, from greater than or equal to 9.0 mol % to less than or equal to 16.0 mol %, from greater than or equal to 10.0 mol % to less than or equal to 15.0 mol %, or from greater than or equal to 11.0 mol % to less than or equal to 14.0 mol %, and all ranges and sub-ranges between the foregoing values. In one or more embodiments, the glass composition comprises an amount of $Al_2O_3$ from greater than or equal to 8.0 mol % to less than or equal to 12.0 mol %, and all ranges and sub-ranges between the foregoing values.

$SiO_2$ and $Al_2O_3$ are glass network forming components and, in embodiments, these glass network forming components comprise a significant portion of the glass composition. For instance, in embodiments, the sum of $SiO_2$ and $Al_2O_3$ in the glass composition is greater than or equal to 80.0 mol %, such as greater than or equal to 81.0 mol %, greater than or equal to 82.0 mol %, greater than or equal to 83.0 mol %, greater than or equal to 84.0 mol %, or greater than or equal to 85.0 mol %. In embodiments the sum of $SiO_2$ and $Al_2O_3$ in the glass composition is less than or equal to 86.0 mol %, less than or equal to 85.0 mol %, less than or equal to 84.0 mol %, less than or equal to 83.0 mol %, less than or equal to 82.0 mol %, or less than or equal to 81.0 mol %. It should be understood that, in embodiments, any of the above ranges may be combined with any other range. However, in other embodiments, the sum of $SiO_2$ and $Al_2O_3$ in the glass composition is from greater than or equal to 80.0 mol % to less than or equal to 86.0 mol %, such as from greater than or equal to 81.0 mol % to less than or equal to 85.0 mol %, or from greater than or equal to 82.0 mol % to less than or equal to 84.0 mol %, and all ranges and sub-ranges between the foregoing values.

The addition of lithium in the glass allows for an ion exchange process and further reduces the softening point of the glass. In embodiments, the glass composition generally comprises $Li_2O$ in an amount greater than or equal to 0.0 mol %, such as greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, or greater than or equal to 9.5 mol %. In some embodiments, the glass composition comprises $Li_2O$ in amounts less than or equal to 10.0 mol %, such as less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in yet other embodiments, the glass composition comprises $Li_2O$ in an amount from greater than or equal to 0.0 mol % to less than or equal to 10.0 mol %, such as from greater than or equal to 0.5 mol % to less than or equal to 9.5 mol %, from greater than or equal to 1.0 mol % to less than or equal to 9.0 mol %, from greater than or equal to 1.5 mol % to less than or equal to 8.5 mol %, from greater than or equal to 2.0 mol % to less than or equal to 8.0 mol %, from greater than or equal to 2.5 mol % to less than or equal to 7.5 mol %, from greater than or equal to 3.0 mol % to less than or equal to 7.0 mol %, from greater than or equal to 3.5 mol % to less than or equal to 6.5 mol %, or from greater than or equal to 4.0 mol % to less than or equal to 6.0 mol %, and all ranges and sub-ranges between the foregoing values.

Like $Li_2O$, $Na_2O$ aids in the ion exchangeability of the glass composition, and also decreases the melting point of the glass composition and improves formability of the glass composition. However, if too much $Na_2O$ is added to the glass composition, the CTE may be too high. In embodiments, the glass composition generally comprises $Na_2O$ in an amount greater than or equal to 3.0 mol %, such as greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, or greater than or equal to 11.5 mol %. In some embodiments, the glass composition comprises $Na_2O$ in amounts less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, or less than or equal to 3.5 mol %. It should be understood that, in embodiments, any of the above ranges may be combined with any other range. However, in yet other embodiments, the glass composition comprises $Na_2O$ in an amount from greater than or equal to 3.0 mol % to less than or equal to 12.0 mol %, such as from greater than or equal to 3.5 mol % to less than or equal to 11.5 mol %, from greater than or equal to 4.0 mol % to less than or equal to 11.0 mol %, from greater than or equal to 4.5 mol % to less than or equal to 10.5 mol %, from greater than or equal to 5.0 mol % to less than or equal to 10.0 mol %, from greater than or equal to 5.5 mol % to less than or equal to 9.5 mol %, from greater than or equal to 6.0 mol % to less than or equal to 9.0 mol %, or from greater than or equal to 6.5 mol % to less than or equal to 8.5 mol %, and all ranges and sub-ranges between the foregoing values.

Like $Na_2O$, $K_2O$ also promotes ion exchange and increases the DOC of a compressive stress layer. However, adding $K_2O$ may cause the CTE increase. In embodiments, the glass composition generally comprises $K_2O$ in an amount greater than or equal to 0.0 mol %, such as greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, as greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, or greater than or equal to 11.5 mol %. In some embodiments, the glass composition comprises $K_2O$ in amounts less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in yet other embodiments, the glass composition comprises $K_2O$ in an amount from greater than or equal to 0.0 mol % to less than or equal to 12.0 mol %, such as from greater than or equal to 3.5 mol % to less than or equal to 11.5 mol %, from greater than or equal to 4.0 mol % to less than or equal to 11.0 mol %, from greater than or equal to 4.5 mol % to less than or equal to 10.5 mol %, from greater than or equal to 5.0 mol % to less than or equal to 10.0 mol %, from greater than or equal to 5.5 mol % to less than or equal to 9.5 mol %, from greater than or equal to 6.0 mol % to less than or equal to 9.0 mol %, or from greater than or equal to 6.5 mol % to less than or equal to 8.5 mol %, and all ranges and sub-ranges between the foregoing values. In some embodiments, the glass composition comprises $K_2O$ in amounts from greater than or equal to 7.0 mol % to less than or equal to 11.0 mol %

The sum of the alkali metal oxides (e.g., $Li_2O$, $Na_2O$, and $K_2O$ as well as other alkali metal oxides including $Cs_2O$ and $Rb_2O$) in the glass composition may be referred to as "$R_2O$", and $R_2O$ may be expressed in mol %. However, as used herein, $R_2O$ includes at least two alkali metal oxides and, in some embodiments, includes two alkali metal oxides, includes three alkali metal oxides, or includes four alkali metal oxides. In some embodiments, $R_2O$ may be a combination of $Li_2O$ and $Na_2O$. In other embodiments, $R_2O$ may be a combination of $Na_2O$ and $K_2O$. In still other embodiments, $R_2O$ may be a combination of $Li_2O$ and $K_2O$. In one or more embodiments, $R_2O$ may be a combination of $Li_2O$, $Na_2O$, and $K_2O$. In embodiments, each of the alkali metal oxides that comprise $R_2O$ is present in an amount greater than or equal to 0.5 mol %. For example, if $R_2O$ comprises $Li_2O$ and $Na_2O$, both $Li_2O$ and $Na_2O$ are present in an amount greater than or equal to 0.5 mol %, and if $R_2O$ comprises $Li_2O$, $Na_2O$, and $K_2O$, all of $Li_2O$, $Na_2O$, and $K_2O$ are present in an amount greater than or equal to 0.5 mol %.

In one or more embodiments, the glass composition comprises $R_2O$ in an amount greater than or equal to 14.0 mol %, such as greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, greater than or equal to 20.5 mol %, greater than or equal to 21.0 mol %, greater than or equal to 21.5 mol %, greater than or equal to 22.0 mol %, greater than or equal to 22.5 mol %, greater than or equal to 23.0 mol %, greater than or equal to 23.5 mol %, greater than or equal to 24.0 mol %, or greater than or equal to 24.5 mol %. In one or more embodiments, the glass composition comprises $R_2O$ in an amount less than or equal to 25.0 mol %, such as less than or equal to 24.5 mol %, less than or equal to 24.0 mol %, less than or equal to 23.5 mol %, less than or equal to 23.0 mol %, less than or equal to 22.5 mol %, less than or equal to 22.0 mol %, less than or equal to 21.5 mol %, less than or equal to 21.0 mol %, less than or equal to 20.5 mol %, less than or equal to 20.0 mol %, less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, less than or equal to 15.5 mol %, less than or equal to 15.0 mol %, or less than or equal to 14.5 mol %. It should be understood that, in embodiments, any of the above ranges may be combined with any other range. However, in yet other embodiments, the glass composition comprises $R_2O$ in an amount from greater than or equal to 14.0 mol % to less than or equal to 25.0 mol %, such as from greater than or equal to 14.5 mol % to less than or equal to 24.5 mol %, from greater than or equal to 15.0 mol % to less than or equal to 24.0 mol %, from greater than or equal to 15.5 mol % to less than or equal to 23.5 mol %, from greater than or equal to 16.0 mol % to less than or equal to 23.0 mol %, from greater than or equal to 16.5 mol % to less than or equal to 22.5 mol %, from greater than or equal to 17.0 mol % to less than or equal to 22.0 mol %, from greater than or equal to 17.5 mol % to less than or equal to 21.5 mol %, or from greater than or equal to 18.0 mol % to less than or equal to 21.0 mol %, and all ranges and sub-ranges between the foregoing values.

In embodiments, $R_2O$ comprises $Na_2O$ and $Li_2O$. In one or more embodiments where $R_2O$ comprises $Na_2O$ and $Li_2O$, a ratio of $Na_2O/Li_2O$, in mol %, is greater than or equal to 1.0, such as greater than or equal to 1.2, greater than or equal to 1.4, greater than or equal to 1.6, greater than or equal to 1.8, greater than or equal to 2.0, greater than or equal to 2.2, greater than or equal to 2.4, greater than or equal to 2.6, or greater than or equal to 2.8. In some embodiments where $R_2O$ comprises $Na_2O$ and $Li_2O$, a ratio of $Na_2O/Li_2O$, in mol %, is less than or equal to 3.0, such as less than or equal to 2.8, less than or equal to 2.6, less than or equal to 2.4, less than or equal to 2.2, less than or equal to 2.0, less than or equal to 1.8, less than or equal to 1.6, less than or equal to 1.4, or less than or equal to 1.2. It should be understood that, in embodiments, any of the above ranges may be combined with any other range. However, in yet other embodiments where $R_2O$ comprises $Na_2O$ and $Li_2O$, a ratio of $Na_2O/Li_2O$, in mol %, is from greater than or equal to 1.0 to less than or equal to 3.0, such as from greater than or equal to 1.2 to less than or equal to 2.8, from greater than or equal to 1.4 to less than or equal to 2.6, from greater than or equal to 1.6 to less than or equal to 2.4, or from greater than or equal to 1.8 to less than or equal to 2.2, and all ranges and sub-ranges between the foregoing values.

In embodiments, $R_2O$ comprises $K_2O$ and $Na_2O$, and the sum of $K_2O$ and $Na_2O$ is from greater than or equal to 15.0 mol % to less than or equal to 21.0 mol %, such as from greater than or equal to 15.5 mol % to less than or equal to 20.5 mol %, from greater than or equal to 16.0 mol % to less than or equal to 20.0 mol %, from greater than or equal to 16.5 mol % to less than or equal to 19.5 mol %, or from greater than or equal to 17.0 mol % to less than or equal to 19.0 mol %. In one or more embodiments where $R_2O$ comprises $K_2O$ and $Na_2O$, a ratio of $K_2O/Na_2O$, in mol %, is greater than or equal to 1.0, such as greater than or equal to 1.2, greater than or equal to 1.4, greater than or equal to 1.6, greater than or equal to 1.8, greater than or equal to 2.0, greater than or equal to 2.2, greater than or equal to 2.4, greater than or equal to 2.6, or greater than or equal to 2.8. In some embodiments where $R_2O$ comprises $K_2O$ and $Na_2O$, a ratio of $K_2O/Na_2O$, in mol %, is less than or equal to 3.0, such as less than or equal to 2.8, less than or equal to 2.6, less than or equal to 2.4, less than or equal to 2.2, less than or equal to 2.0, less than or equal to 1.8, less than or equal to 1.6, less than or equal to 1.4, or less than or equal to 1.2. It should be understood that, in embodiments, any of the above ranges may be combined with any other range. However, in yet other embodiments where $R_2O$ comprises $K_2O$ and $Na_2O$, a ratio of $K_2O/Na_2O$, in mol %, is from greater than or equal to 1.0 to less than or equal to 3.0, such as from greater than or equal to 1.2 to less than or equal to 2.8, from greater than or equal to 1.4 to less than or equal to 2.6, from greater than or equal to 1.6 to less than or equal to 2.4, or from greater than or equal to 1.8 to less than or equal to 2.2, and all ranges and sub-ranges between the foregoing values.

In embodiments, $R_2O$ comprises $Li_2O$, $Na_2O$, and $K_2O$, and the sum of $Li_2O$, $Na_2O$, and $K_2O$ is from greater than or equal to 15.0 mol % to less than or equal to 21.0 mol %, such as from greater than or equal to 15.5 mol % to less than or equal to 20.5 mol %, from greater than or equal to 16.0 mol % to less than or equal to 20.0 mol %, from greater than or equal to 16.5 mol % to less than or equal to 19.5 mol %, or from greater than or equal to 17.0 mol % to less than or equal to 19.0 mol %. In one or more embodiments where $R_2O$ comprises $Li_2O$, $Na_2O$, and $K_2O$, a ratio of $K_2O/Li_2O$, in mol %, is greater than or equal to 1.0, such as greater than or equal to 1.5, greater than or equal to 2.0, greater than or equal to 2.5, greater than or equal to 3.0, greater than or equal to 3.5, greater than or equal to 4.0, greater than or equal to 4.5, greater than or equal to 5.0, greater than or equal to 5.5, greater than or equal to 6.0, greater than or equal to 6.5, or greater than or equal to 7.0. In some embodiments where $R_2O$ comprises $Li_2O$, $Na_2O$, and $K_2O$, a ratio of $K_2O/Li_2O$, in mol %, is less than or equal to 7.5, such as less than or equal to 7.0, less than or equal to 6.5, less than or equal to 6.0, less than or equal to 5.5, less than or equal to 5.0, less than or equal to 4.5, less than or equal to 4.0, less than or equal to 3.5, less than or equal to 3.0, less than or equal to 2.8, less than or equal to 2.6, less than or equal to 2.4, less than or equal to 2.2, less than or equal to 2.0, less than or equal to 1.8, less than or equal to 1.6, less than or equal to 1.4, or less than or equal to 1.2. It should be understood that, in embodiments, any of the above ranges may be combined with any other range. However, in yet other embodiments where $R_2O$ comprises $Li_2O$, $Na_2O$, and $K_2O$, a ratio of $K_2O/Li_2O$, in mol %, is from greater than or equal to 1.0 to less than or equal to 7.5, such as from greater than or equal to 1.5 to less than or equal to 7.0, from greater than or equal to 2.0 to less than or equal to 6.5, from greater than or equal to 2.5 to less than or equal to 6.0, from greater than or equal to 3.0 to less than or equal to 5.5, or from greater than or equal to 3.5 to less than or equal to 5.0, and all ranges and sub-ranges between the foregoing values. In some embodiments where $R_2O$ comprises $Li_2O$, $Na_2O$, and $K_2O$, a ratio of $K_2O/Na_2O$, in mol %, is greater than or equal to 1.0, such as greater than or equal to 1.2, greater than or equal to 1.4, greater than or equal to 1.6, greater than or equal to 1.8, greater than or equal to 2.0, greater than or equal to 2.2, greater than or equal to 2.4, greater than or equal to 2.6, or greater than or equal to 2.8. In some embodiments where $R_2O$ comprises $Li_2O$, $Na_2O$, and $K_2O$, a ratio of $K_2O/Na_2O$, in mol %, is less than or equal to 3.0, such as less than or equal to 2.8, less than or equal to 2.6, less than or equal to 2.4, less than or equal to 2.2, less than or equal to 2.0, less than or equal to 1.8, less than or equal to 1.6, less than or equal to 1.4, or less than or equal to 1.2. It should be understood that, in embodiments, any of the above ranges may be combined with any other range. However, in yet other embodiments where $R_2O$ comprises $Li_2O$, $Na_2O$, and $K_2O$, a ratio of $K_2O/Na_2O$, in mol %, is from greater than or equal to 1.0 to less than or equal to 3.0, such as from greater than or equal to 1.2 to less than or equal to 2.8, from greater than or equal to 1.4 to less than or equal to 2.6, from greater than or equal to 1.6 to less than or equal to 2.4, or from greater than or equal to 1.8 to less than or equal to 2.2, and all ranges and sub-ranges between the foregoing values.

In embodiments, the glass composition may optionally include one or more fining agents. In some embodiments, the fining agents may include, for example, $SnO_2$. In such embodiments, $SnO_2$ may be present in the glass composition in an amount less than or equal to 0.2 mol %, such as from greater than or equal to 0.0 mol % to less than or equal to 0.1 mol %, and all ranges and sub-ranges between the foregoing values. In other embodiments, $SnO_2$ may be present in the glass composition in an amount from greater than or equal to 0.0 mol % to less than or equal to 0.2 mol %, or greater than or equal to 0.1 mol % to less than or equal to 0.2 mol %, and all ranges and sub-ranges between the foregoing values. In some embodiments, the glass composition may be free of $SnO_2$.

In embodiments, the glass article may be substantially free of one or both of arsenic and antimony. In other embodiments, the glass article may be free of one or both of arsenic and antimony.

From the above, glass compositions according to embodiments may be formed by any suitable method, such as slot forming, float forming, rolling processes, fusion forming processes, etc.

The glass article may be characterized by the manner in which it is formed. For instance, where the glass article may be characterized as float-formable (i.e., formed by a float process), down-drawable and, in particular, fusion-formable or slot-drawable (i.e., formed by a down draw process such as a fusion draw process or a slot draw process).

Some embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In embodiments, the alkali-containing glass compositions can be strengthened, such as by ion exchange, making a glass that is damage resistant for applications such as, but not limited to, glass for display covers. With reference to FIG. 1, the glass has a first region under compressive stress (e.g., first and second compressive layers 120, 122 in FIG. 1) extending from the surface to a depth of compression (DOC) of the glass and a second region (e.g., central region 130 in FIG. 1) under a tensile stress or central tension (CT) extending from the DOC into the central or interior region of the glass. As used herein, DOC refers to the depth at which the stress within the glass article changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) may have a maximum at the surface of the glass, and the CS may vary with distance d from the surface according to a function. Referring again to FIG. 1, a first compressive layer 120 extends from first surface 110 to a depth $d_1$ and a second compressive layer 122 extends from second surface 112 to a depth $d_2$. Together, these segments define a compression or CS of glass 100. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The compressive stress of both compressive stress regions (120, 122 in FIG. 1) is balanced by stored tension in the central region (130) of the glass. The maximum central tension (CT) and DOC values are measured using a scattered light polariscope (SCALP) technique known in the art. The Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Compressive stress layers may be formed in the glass by exposing the glass to an ion exchange solution. In embodiments, the ion exchange solution may be molten nitrate salt. In some embodiments, the ion exchange solution may be molten $KNO_3$, molten $NaNO_3$, or combinations thereof. In certain embodiments, the ion exchange solution may comprise about 80% molten $KNO_3$, about 75% molten $KNO_3$, about 70% molten $KNO_3$, about 65% molten $KNO_3$, or about 60% molten $KNO_3$. In certain embodiments, the ion exchange solution may comprise about 20% molten $NaNO_3$, about 25% molten $NaNO_3$, about 30% molten $NaNO_3$, about 35% molten $NaNO_3$, or about 40% molten $NaNO_3$. In other embodiments, the ion exchange solution may comprise about 80% molten $KNO_3$ and about 20% molten $NaNO_3$, about 75% molten $KNO_3$ and about 25% molten $NaNO_3$, about 70% molten $KNO_3$ and about 30% molten $NaNO_3$, about 65% molten $KNO_3$ and about 35% molten $NaNO_3$, or about 60% molten $KNO_3$ and about 40% molten $NaNO_3$, and all ranges and sub-ranges between the foregoing values. In embodiments, other sodium and potassium salts may be used in the ion exchange solution, such as, for example sodium or potassium nitrites, phosphates, or sulfates.

The glass composition may be exposed to the ion exchange solution by dipping a glass article made from the glass composition into a bath of the ion exchange solution, spraying the ion exchange solution onto a glass article made from the glass composition, or otherwise physically applying the ion exchange solution to a glass article made from the glass composition. Upon exposure to the glass composition, the ion exchange solution may, according to embodiments, be at a temperature from greater than or equal to 400° C. to less than or equal to 500° C., such as from greater than or equal to 410° C. to less than or equal to 490° C., from greater than or equal to 420° C. to less than or equal to 480° C., from greater than or equal to 430° C. to less than or equal to 470° C., or from greater than or equal to 440° C. to less than or equal to 460° C., and all ranges and sub-ranges between the foregoing values. In embodiments, the glass composition may be exposed to the ion exchange solution for a duration from greater than or equal to 4 hours to less than or equal to 48 hours, such as from greater than or equal to 8 hours to less than or equal to 44 hours, from greater than or equal to 12 hours to less than or equal to 40 hours, from greater than or equal to 16 hours to less than or equal to 36 hours, from greater than or equal to 20 hours to less than or equal to 32 hours, or from greater than or equal to 24 hours to less than or equal to 28 hours, and all ranges and sub-ranges between the foregoing values.

The ion exchange process may be performed in an ion exchange solution under processing conditions that provide an improved compressive stress profile as disclosed, for example, in U.S. Patent Application Publication No. 2016/0102011, which is incorporated herein by reference in its entirety.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed glass article.

Figure 2A:
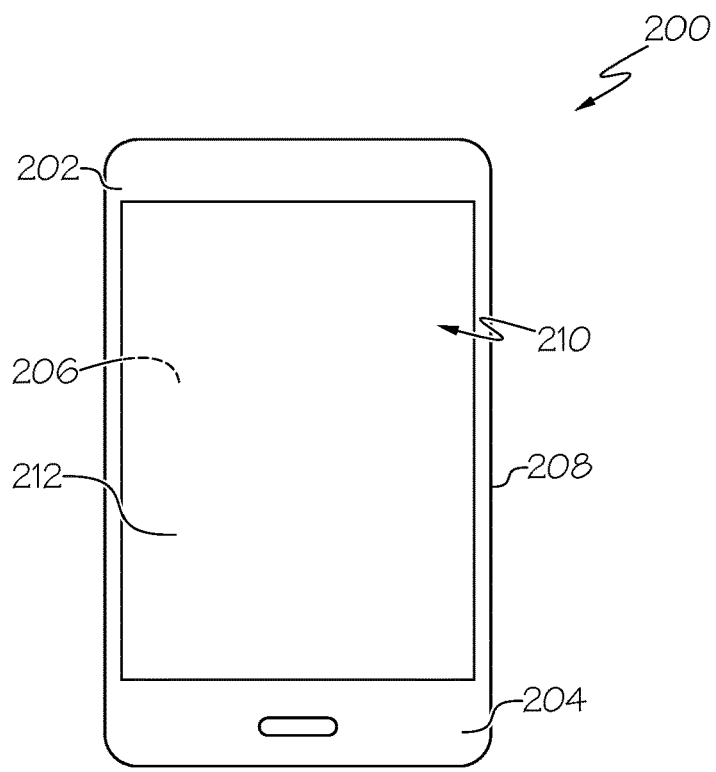
FIG. 2A is a plan view of an exemplary electronic device incorporating any of the glass articles disclosed herein.
Figure 2B:
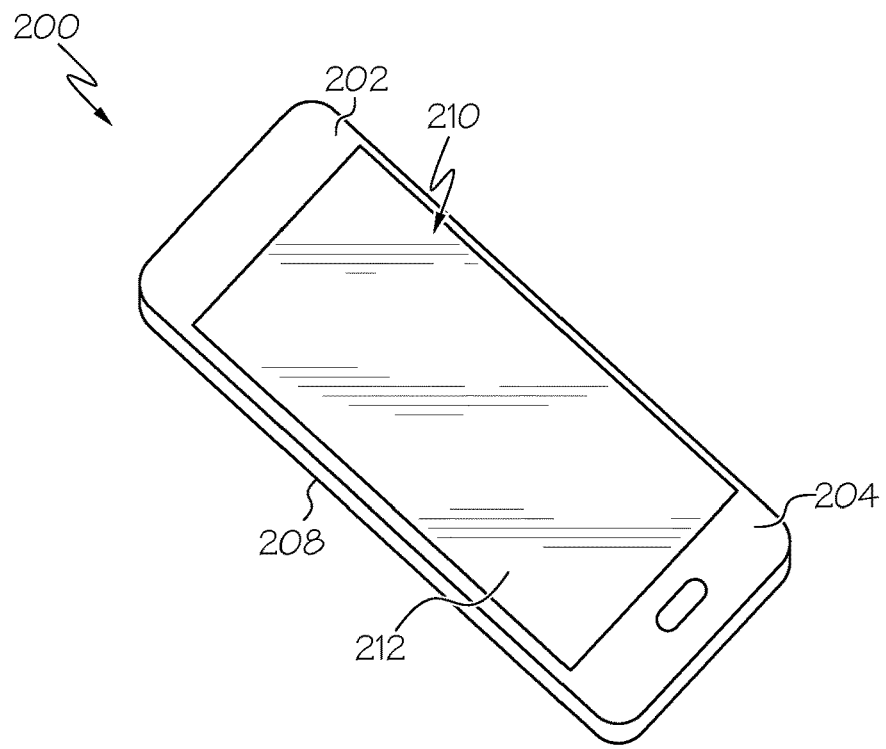
FIG. 2B is a perspective view of the exemplary electronic device of FIG. 2A.

The glass articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of the cover substrate 212 and/or the housing 202 may include any of the glass articles disclosed herein.

A first clause comprises a glass composition comprising: greater than or equal to 69.0 mol % $SiO_2$; greater than or equal to 7.0 mol % $Al_2O_3$; greater than or equal to 14.0 mol % $R_2O$; and an absolute value of a slope of a line extending between a first endpoint and a second endpoint less than or equal to |0.020|, wherein the first endpoint is a Young's modulus at a fictive temperature of the annealing point temperature and the second endpoint is a Young's modulus at a fictive temperature of the strain point temperature, the slope is a change in Young's modulus (GPa) per 1° C. change in fictive temperature, and $R_2O$ is a total amount of alkali metal oxides and comprises at least two alkali metal oxides.

A second clause comprises the glass composition according to the first clause, wherein the absolute value of the slope is less than or equal to |0.015|.

A third clause comprises the glass composition according to any one of the first and second clauses, wherein the absolute value of the slope is less than or equal to |0.010|.

A fourth clause comprises the glass composition according to any one of the first to third clauses, wherein $SiO_2$+ $Al_2O_3$ is greater than 80.0 mol %.

A fifth clause comprises the glass composition according to any one of the first to fourth clauses, wherein $R_2O$ is greater than or equal to 18.0 mol %.

A sixth clause comprises the glass composition according to any one of the first to fifth clauses, wherein $R_2O$ comprises $K_2O$ in an amount from greater than or equal to 7.0 mol % to less than or equal to 11.0 mol %.

A seventh clause comprises the glass composition according to any one of the first to sixth clauses, wherein the glass composition comprises greater than or equal to 72.0 mol % $SiO_2$.

An eighth clause comprises the glass composition according to any one of the first to seventh clauses, wherein each of the at least two alkali metal oxides is present in the glass composition in an amount greater than or equal to 0.5 mol %.

A ninth clause comprises the glass composition according to any one of the first to eighth clauses, wherein $R_2O$ comprises $Na_2O$ and $Li_2O$, and a ratio of $Na_2O/Li_2O$ is greater than or equal to 1.0.

A tenth clause comprises the glass composition according to any one of the first to ninth clauses, wherein the $R_2O$ comprises $K_2O$ and $Na_2O$, and a ratio of $K_2O/Na_2O$ is greater than or equal to 1.0.

An eleventh clause comprises the glass composition according to any one of the first to tenth clauses, wherein $R_2O$ comprises at least three alkali metal oxides.

A twelfth clause comprises the glass composition according to the eleventh clause, wherein each of the at least three alkali metal oxides is present in the glass composition in an amount greater than or equal to 0.5 mol %.

A thirteenth clause comprises the glass composition according to any one of the first to twelfth clauses, wherein $R_2O$ comprises $Li_2O$, $Na_2O$, and $K_2O$, a ratio of $K_2O/Li_2O$ is greater than or equal to 1.0, and a ratio of $K_2O/Na_2O$ is greater than or equal to 1.0.

A fourteenth clause comprises the glass composition according to the thirteenth clause, wherein the ratio of $K_2O/Li_2O$ is greater than or equal to 5.0.

A fifteenth clause comprises the glass composition according to any one of the first to fourteenth clauses, wherein the glass composition comprises: from greater than or equal to 70.0 mol % to less than or equal to 75.0 mol % $SiO_2$; and from greater than or equal to 8.0 mol % to less than or equal to 12.0 mol % $Al_2O_3$, wherein $R_2O$ is greater than or equal to 16.0 mol %.

A sixteenth clause comprises the glass composition according to any one of the first to fifteenth clauses, wherein the glass composition comprises: from greater than or equal to 70.0 mol % to less than or equal to 75.0 mol % $SiO_2$; and from greater than or equal to 8.0 mol % to less than or equal to 12.0 mol % $Al_2O_3$, wherein $R_2O$ comprises $Li_2O$ and $Na_2O$, and $Li_2O+Na_2O$ is from greater than or equal to 14.0 mol % to less than or equal to 15.0 mol %.

A seventeenth clause comprises the glass composition according to any one of the first to sixteenth clauses, wherein the glass composition comprises: from greater than or equal to 70.0 mol % to less than or equal to 75.0 mol % $SiO_2$; and from greater than or equal to 8.0 mol % to less than or equal to 12.0 mol % $Al_2O_3$, wherein $R_2O$ comprises $Na_2O$ and $K_2O$, and $Na_2O+K_2O$ is from greater than or equal to 15.0 mol % to less than or equal to 21.0 mol %.

An eighteenth clause comprises the glass composition according to any one of the first to seventeenth clauses, wherein the glass composition comprises: from greater than or equal to 70.0 mol % to less than or equal to 75.0 mol % $SiO_2$; and from greater than or equal to 8.0 mol % to less than or equal to 12.0 mol % $Al_2O_3$, wherein $R_2O$ comprises $Li_2O$, $Na_2O$, and $K_2O$, and $Li_2O+Na_2O+K_2O$ is from greater than or equal to 15.0 mol % to less than or equal to 21.0 mol %.

A nineteenth clause comprises a glass article formed from the glass composition of any one of the first to eighteenth clauses, comprising: a first surface; a second surface; a central region positioned between the first surface and the second surface; and a compressive stress layer extending from at least one of the first surface and the second surface into the central region of the glass article.

A twentieth clause comprises a consumer electronic product, comprising: a housing comprising a front surface, a back surface and side surfaces; electrical components at least partially within the housing, the electrical components comprising at least a controller, a memory, and a display, the display at or adjacent the front surface of the housing; and a cover substrate disposed over the display, wherein at least a portion of the housing or the cover substrate comprises the glass article of the nineteenth clause.

EXAMPLES

Embodiments will be further clarified by the following examples. It should be understood that these examples are not limiting to the embodiments described above.

Glass compositions a having components listed in Table 1 below were prepared by conventional glass forming methods. In Table 1, all components are in mol %, and various properties of the glass compositions were measured according to the methods disclosed in this specification. Each of the samples in Table 1 yielded a glass where the slope of a line extending from the first endpoint to the second endpoint—as defined above and listed in Table 1 as "Slope dE/dT (GPa/° C.)—is less than or equal to |0.020|.

TABLE 1

| Mol % | 1 | 2 | 3 | 4 | 5 | 6 | 7 |
|---|---|---|---|---|---|---|---|
| $SiO_2$ | 72.94 | 75.29 | 73.96 | 74.26 | 74.26 | 74.35 | 69.70 |
| $Al_2O_3$ | 10.03 | 9.94 | 10.07 | 10.08 | 10.11 | 9.93 | 9.88 |
| $Li_2O$ | | 7.11 | | | 0.94 | 0.97 | |
| $Na_2O$ | 8.31 | 7.48 | 7.84 | 7.66 | 7.30 | 7.21 | 9.96 |
| $K_2O$ | 8.55 | 0.01 | 7.96 | 7.81 | 7.20 | 7.37 | 10.29 |
| $SnO_2$ | 0.10 | 0.10 | 0.10 | 0.10 | 0.10 | 0.10 | 0.10 |
| Sum | 100 | 100 | 100 | 100 | 100 | 100 | 100 |
| Properties of the As-Poured Glass | | | | | | | |
| VFT Viscosity Coefficients | | | | | | | |
| A | | −2.541 | | | | | |
| B | | 8893.6 | | | | | |
| To | | −101 | | | | | |
| Temps at Fixed Viscosities (P) | | | | | | | |
| 200 | | 1736 | | | | | |
| 35000 | | 1154 | | | | | |
| 50000 | | 1127 | | | | | |
| 100000 | | 1078 | | | | | |
| 160000 | | 1047 | | | | | |
| 200000 | | 1033 | | | | | |
| 250000 | | 1019 | | | | | |
| Density (g/cm³) | 2.42 | 2.378 | 2.411 | 2.408 | 2.407 | 2.407 | 2.446 |
| Expansion ($10^{-7}$/° C.) | 91.2 | 67 | 87.4 | 86.1 | 85.1 | 85.6 | 104 |
| Strain Point (° C.) | 518 | 497 | 525 | 529 | 510 | 508 | 490 |
| Annealing Point (° C.) | 567 | 543 | 576 | 581 | 562 | 558 | 537 |
| Softening Point (° C.) | 822.1 | 794.9 | 845.8 | 853.1 | 836.8 | 832.1 | 766.4 |
| Liquidus Air (° C.) | | | 1055 | 1105 | 1000 | 1015 | |
| Liquidus Internal (° C.) | | | 1080 | 1080 | 1015 | 1015 | |
| Liquidus Platinum (° C.) | | | 1060 | 1040 | 1010 | 1085 | |
| Primary Phase | | | Leucite | Leucite | Leucite | Leucite | |
| Secondary Phase | | | Sanidine | Sanidine | Sanidine | Sanidine | |
| Refractive Index | 1.4969 | 1.5005 | 1.4956 | 1.4949 | 1.4959 | 1.4960 | |
| Refractive Index (2 * stdev) | 0.0003 | 0.0003 | 0.0002 | 0.0001 | 0.0001 | 0.0001 | |
| Disk CTE 25-300 | 9.30 | 6.81 | 8.27 | 8.44 | 8.74 | 8.61 | |
| E (Young's Modulus, Mpsi) | 9.9 | 11.32 | 9.9 | 9.94 | 10.16 | 10.14 | |
| G (Shear Modulus, Mpsi) | 4.09 | 4.73 | 4.12 | 4.13 | 4.23 | 4.2 | |
| Poisson's Ratio | 0.210 | 0.197 | 0.201 | 0.203 | 0.201 | 0.206 | |
| E (Young's Modulus, GPa) | 68.3 | 78.1 | 68.3 | 68.5 | 70.1 | 69.9 | |
| G (Shear Modulus, GPa) | 28.2 | 32.6 | 28.4 | 28.5 | 29.2 | 29.0 | |
| BBV Strain Point (° C.) | 511.7 | 493.8 | 533.5 | 526.7 | 507.2 | 504.7 | 487.1 |
| BBV Anneal Point (° C.) | 561.8 | 541.6 | 585.6 | 579.4 | 559.2 | 556.7 | 534.4 |
| PPV Softening Point (° C.) | 825.1 | 800.4 | 845.1 | 855.2 | 836.7 | 830.3 | |
| Properties as a function of fictive temperature | | | | | | | |
| Time (hr) | 21 | 24.6 | 26 | 424.5 | 25 | 24 | 20 |
| Temperature (° C.) | 562 | 542 | 586 | 579 | 559 | 557 | 539 |
| E (Young's Modulus, Mpsi) | 9.8 | 11.25 | 9.87 | 9.89 | 10.12 | 10.1 | 9.65 |
| G (Shear Modulus, Mpsi) | 4.05 | 4.7 | 4.1 | 4.13 | 4.21 | 4.195 | 3.97 |

TABLE 1-continued

| | | | | | | | |
|---|---|---|---|---|---|---|---|
| Poisson's Ratio | 0.209 | 0.197 | 0.205 | 0.198 | 0.202 | 0.205 | 0.217 |
| E (Young's Modulus, GPa) | 67.57 | 77.57 | 68.05 | 68.19 | 69.77 | 69.64 | 66.53 |
| G (Shear Modulus, GPa) | 27.92 | 32.41 | 28.27 | 28.48 | 29.03 | 28.92 | 27.37 |
| Refractive Index | 1.4968 | 1.5004 | 1.4949 | 1.4947 | 1.4959 | 1.496 | |
| Refractive Index (2 * stdev) | 0.0001 | 0.0001 | 0.0003 | 0.0002 | 0.0003 | 0.0003 | |
| Density (g/cm$^3$) | 2.419 | 2.377 | 2.41 | 2.406 | 2.405 | 2.406 | |
| Time (hr) | 143 | 166 | 168 | 258 | 169 | 258 | 165 |
| Temperature (° C.) | 512 | 494 | 534 | 527 | 507 | 505 | 494 |
| E (Young's Modulus, Mpsi) | 9.95 | 11.34 | 9.9 | 9.98 | 10.17 | 10.165 | 9.77 |
| G (Shear Modulus, Mpsi) | 4.1 | 4.73 | 4.13 | 4.15 | 4.26 | 4.245 | 4 |
| Poisson's Ratio | 0.213 | 0.198 | 0.199 | 0.202 | 0.193 | 0.197 | 0.222 |
| E (Young's Modulus, GPa) | 68.60 | 78.19 | 68.26 | 68.81 | 70.12 | 70.09 | 67.36 |
| G (Shear Modulus, GPa) | 28.27 | 32.61 | 28.48 | 28.61 | 29.37 | 29.27 | 27.58 |
| Refractive Index | 1.4977 | 1.5014 | 1.4960 | 1.4956 | 1.4968 | 1.4968 | |
| Refractive Index (2 * stdev) | 0.0002 | 0.0001 | 0.0002 | 0.0001 | 0.0003 | 0.0002 | |
| Density (g/cm$^3$) | 2.423 | 2.382 | 2.411 | 2.410 | 2.410 | 2.409 | |
| Changes in properties as a function of fictive temperature at strain and anneal points | | | | | | | |
| Slope dE/dT (GPa/° C.) | −0.020 | −0.013 | −0.004 | −0.012 | −0.007 | −0.009 | −0.018 |
| Slope dG/dT (GPa/° C.) | −0.007 | −0.004 | −0.004 | −0.003 | −0.007 | −0.007 | −0.004 |

| Mol % | 8 | 9 | 10 | 11 |
|---|---|---|---|---|
| SiO$_2$ | 72.02 | 74.80 | 74.87 | 69.42 |
| Al$_2$O$_3$ | 9.89 | 9.99 | 10.01 | 9.82 |
| Li$_2$O | | | 0.94 | 6.51 |
| Na$_2$O | 8.86 | 7.42 | 6.95 | 6.89 |
| K$_2$O | 9.06 | 7.61 | 7.04 | 7.19 |
| SnO$_2$ | 0.10 | 0.10 | 0.10 | 0.10 |
| Sum | 100 | 100 | 100 | 100 |
| Properties of the As-Poured Glass | | | | |
| VFT Viscosity Coefficients | | | | |
| A | | | | |
| B | | | | |
| To | | | | |
| Temps at Fixed Viscosities (P) | | | | |
| 200 | | | | |
| 35000 | | | | |
| 50000 | | | | |
| 100000 | | | | |
| 160000 | | | | |
| 200000 | | | | |
| 250000 | | | | |
| Density (g/cm$^3$) | 2.428 | 2.404 | 2.402 | 2.428 |
| Expansion (10$^{-7}$/° C.) | 95.4 | 83.8 | 83.7 | |
| Strain Point (° C.) | 507 | 535 | 515 | |
| Annealing Point (° C.) | 555 | 588 | 566 | |
| Softening Point (° C.) | 804.4 | 862.7 | 843.9 | 704 |
| Liquidus Air (° C.) | | 1035 | 1015 | 1045 |
| Liquidus Internal (° C.) | | 1025 | 1015 | 1065 |
| Liquidus Platinum (° C.) | | 1015 | 985 | 1045 |
| Primary Phase | | Leucite | Leucite | Leucite |
| Secondary Phase | | Sanidine | Sanidine | |
| Refractive Index | 1.4985 | 1.4944 | 1.4951 | 1.5059 |
| Refractive Index (2 * stdev) | 0.0002 | 0.0003 | 0.0003 | 0.0007 |
| Disk CTE 25-300 | 9.80 | 8.42 | 8.59 | |
| E (Young's Modulus, Mpsi) | 9.84 | 9.93 | 10.12 | 10.72 |
| G (Shear Modulus, Mpsi) | 4.1 | 4.1 | 4.2 | 4.4 |
| Poisson's Ratio | 0.212 | 0.201 | 0.193 | 0.211 |
| E (Young's Modulus, GPa) | 67.8 | 68.5 | 69.8 | 73.9 |
| G (Shear Modulus, GPa) | 28.0 | 28.5 | 29.2 | 30.3 |
| BBV Strain Point (° C.) | 503.9 | 524.7 | 509.1 | 446.2 |
| BBV Anneal Point (° C.) | 552.8 | 576.6 | 562.3 | 489.3 |
| PPV Softening Point (° C.) | 800.9 | 862.5 | 841.3 | 704 |
| Properties as a function of fictive temperature | | | | |
| Time (hr) | 64 | 78 | 78 | 24 |
| Temperature (° C.) | 553 | 577 | 562.3 | 489 |
| E (Young's Modulus, Mpsi) | 9.77 | 9.91 | 10.12 | 10.65 |
| G (Shear Modulus, Mpsi) | 4.03 | 4.12 | 4.22 | 4.4 |
| Poisson's Ratio | 0.213 | 0.203 | 0.199 | 0.209 |
| E (Young's Modulus, GPa) | 67.36 | 68.33 | 69.77 | 73.43 |
| G (Shear Modulus, GPa) | 27.79 | 28.41 | 29.10 | 30.34 |
| Refractive Index | 1.4985 | | 1.4948 | |
| Refractive Index (2 * stdev) | 0.0002 | | 0.0007 | |
| Density (g/cm$^3$) | | | | |

TABLE 1-continued

| | | | | |
|---|---|---|---|---|
| Time (hr) | 173 | 162 | 162 | 166 |
| Temperature (° C.) | 504 | 525 | 509.1 | 446 |
| E (Young's Modulus, Mpsi) | 9.88 | 10 | 10.22 | 10.73 |
| G (Shear Modulus, Mpsi) | 4.07 | 4.16 | 4.26 | 4.43 |
| Poisson's Ratio | 0.215 | 0.202 | 0.200 | 0.211 |
| E (Young's Modulus, GPa) | 68.12 | 68.95 | 70.46 | 73.98 |
| G (Shear Modulus, GPa) | 28.06 | 28.68 | 29.37 | 30.54 |
| Refractive Index | 1.4992 | | 1.4957 | 1.5073 |
| Refractive Index (2 * stdev) | 0.0003 | | 0.0001 | 0.0002 |
| Density (g/cm$^3$) | | | 2.406 | 2.432 |
| Changes in properties as a function of fictive temperature at strain and anneal points | | | | |
| Slope dE/dT (GPa/° C.) | −0.016 | −0.012 | −0.013 | −0.013 |
| Slope dG/dT (GPa/° C.) | −0.006 | −0.005 | −0.005 | −0.005 |

Glass compositions having components listed in Table 2 below were prepared by conventional glass forming methods. In Table 2, all components are in mol %, and various properties of the glass compositions were measured according to the methods disclosed in this specification. The viscosity of the glass at the liquidus temperature is measured in accordance with ASTM C965-96 (2012), titled "Standard Practice for Measuring Viscosity of Glass Above the Softening Point". Each of the samples in Table 2 are comparative examples that yielded a glass where the slope of a line extending from the first endpoint to the second endpoint—as defined above and listed in Table 2 as "Slope dE/dT (GPa/° C.)—is greater than |0.020|.

TABLE 2

| Mol % | Comp. 1 | Comp. 2 | Comp. 3 | Comp. 4 | Comp. 5 | Comp. 6 |
|---|---|---|---|---|---|---|
| SiO$_2$ | 70.35 | 69.94 | 72.20 | 70.06 | 57.08 | 70.03 |
| Al$_2$O$_3$ | 10.00 | 9.98 | 8.18 | 9.85 | 15.52 | 9.82 |
| Li$_2$O | | 19.97 | | 9.63 | | 9.89 |
| Na$_2$O | 19.57 | 0.03 | 0.06 | 10.28 | 0.07 | 0.05 |
| K$_2$O | 0.01 | 0.01 | 19.38 | 0.01 | 13.49 | 10.04 |
| B$_2$O$_3$ | | | | | 13.66 | |
| SnO$_2$ | | | 0.10 | 0.10 | 0.09 | 0.09 |
| Sum | 100 | 100 | 100 | 100 | 100 | 100 |
| Properties of the As-Poured Glass | | | | | | |
| VFT Viscosity Coefficients | | | | | | |
| A | −3.217 | −3.218 | | | | |
| B | 8351 | 8532.4 | | | | |
| To | 103.3 | 94.3 | | | | |
| Temps at Fixed Viscosities (P) | | | | | | |
| 200 | 1617 | 1640 | | | | |
| 35000 | 1179 | 1194 | | | | |
| 50000 | 1158 | 1172 | | | | |
| 100000 | 1120 | 1133 | | | | |
| 160000 | 1095 | 1107 | | | | |
| 200000 | 1084 | 1096 | | | | |
| 250000 | 1073 | 1085 | | | | |
| Density (g/cm$^3$) | 2.437 | 2.37 | 2.42 | 2.42 | 2.32 | 2.401 |
| Expansion (10$^{-7}$/° C.) | 92 | | 101 | 83.70 | 83.80 | 87 |
| Strain Point (° C.) | 505 | | 549 | 456 | 537 | 484 |
| Annealing Point (° C.) | 551 | | 603 | 495 | 595 | 528 |
| Softening Point (° C.) | 762.6 | | 844.1 | 694 | 921.1 | 742.4 |
| Liquidus Air (° C.) | | | | | | |
| Liquidus Internal (° C.) | | | | | | |
| Liquidus Platinum (° C.) | | | | | | |
| Primary Phase | | | | | | |
| Secondary Phase | | | | | | |
| Refractive Index | | | | | | |
| Refractive Index (2 * stdev) | | | | | | |
| Disk CTE, 25-300 | 8.99 | | | | | |
| E (Young's Modulus, Mpsi) | 11.44 | 11.64 | | | | |
| G (Shear Modulus, Mpsi) | 4.72 | 4.79 | | | | |
| Poisson's Ratio | 0.212 | 0.216 | | | | |
| E (Young's Modulus, GPa) | 78.9 | 80.3 | | | | |
| G (Shear Modulus, GPa) | 32.5 | 33.0 | | | | |
| BBV Strain Point (° C.) | 502.6 | 476.3 | | | | 487.1 |
| BBV Anneal Point (° C.) | 547.2 | 516.4 | | | | 531 |
| PPV Softening Point (° C.) | 765.7 | | | | | |

TABLE 2-continued

Properties as a function of fictive temperature

| Time (hr) | 2 | 2 | 2 | 3 | 66 | 4.5 |
|---|---|---|---|---|---|---|
| Temperature (° C.) | 550 | 516 | 600 | 495 | 595 | 531 |
| E (Young's Modulus, Mpsi) | 9.86 | 11.84 | 8.29 | 11.3 | 7.43 | 10.42 |
| G (Shear Modulus, Mpsi) | 4.09 | 4.9 | 3.39 | 4.68 | 2.99 | 4.31 |
| Poisson's Ratio | 0.206 | 0.208 | 0.223 | 0.207 | 0.242 | 0.21 |
| E (Young's Modulus, GPa) | 67.98 | 81.63 | 57.16 | 77.91 | 51.23 | 71.84 |
| G (Shear Modulus, GPa) | 28.20 | 33.78 | 23.37 | 32.27 | 20.62 | 29.72 |
| Refractive Index | 1.4997 | 1.5196 | | | | |
| Refractive Index (2 * stdev) | | | | | | |
| Density (g/cm$^3$) | | | | | | |
| Time (hr) | 286 | 241 | 289 | 288 | 185 | 239 |
| Temperature (° C.) | 505 | 476 | 549 | 456 | 538 | 487 |
| E (Young's Modulus, Mpsi) | 10.06 | 12.03 | 8.46 | 11.44 | 7.63 | 10.64 |
| G (Shear Modulus, Mpsi) | 4.15 | 4.97 | 3.45 | 4.73 | 3.05 | 4.35 |
| Poisson's Ratio | 0.212 | 0.21 | 0.226 | 0.21 | 0.25 | 0.223 |
| E (Young's Modulus, GPa) | 69.36 | 82.94 | 58.33 | 78.88 | 52.61 | 73.36 |
| G (Shear Modulus, GPa) | 28.61 | 34.27 | 23.79 | 32.61 | 21.03 | 29.99 |
| Refractive Index | 1.4997 | 1.5196 | | | | |
| Refractive Index (2 * stdev) | | | | | | |
| Density (g/cm$^3$) | | | | | | |

Changes in properties as a function of fictive temperature at strain and anneal points

| Slope dE/dT (GPa/° C.) | −0.030 | −0.032 | −0.023 | −0.025 | −0.024 | −0.035 |
|---|---|---|---|---|---|---|
| Slope dG/dT (GPa/° C.) | −0.009 | −0.012 | −0.008 | −0.009 | −0.007 | −0.006 |

| Mol % | Comp. 7 | Comp. 8 |
|---|---|---|
| SiO$_2$ | 71.48 | 72.97 |
| Al$_2$O$_3$ | 9.92 | 9.85 |
| Li$_2$O | 8.99 | 8.23 |
| Na$_2$O | 9.43 | 8.75 |
| K$_2$O | 0.01 | 0.01 |
| SnO$_2$ | 0.10 | 0.10 |
| Sum | 100 | 100 |

Properties of the As-Poured Glass

| VFT Viscosity Coefficients | | |
|---|---|---|
| A | −1.781 | −1.996 |
| B | 6221.4 | 7077.8 |
| To | 38.4 | −14.1 |
| Temps at Fixed Viscosities (P) | | |
| 200 | 1562 | 1633 |
| 35000 | 1022 | 1068 |
| 50000 | 998 | 1043 |
| 100000 | 956 | 998 |
| 160000 | 929 | 969 |
| 200000 | 917 | 956 |
| 250000 | 905 | 943 |
| Density (g/cm$^3$) | 2.406 | 2.396 |
| Expansion (10$^{-7}$/° C.) | 79.7 | 75.1 |
| Strain Point (° C.) | 464 | 473 |
| Annealing Point (° C.) | 505 | 516 |
| Softening Point (° C.) | 712.8 | 737.6 |
| Liquidus Air (° C.) | | |
| Liquidus Internal (° C.) | | |
| Liquidus Platinum (° C.) | | |
| Primary Phase | | |
| Secondary Phase | | |
| Refractive Index | 1.5076 | 1.5047 |
| Refractive Index (2 * stdev) | 0.0003 | 0.0002 |
| Disk CTE 25-300 | 8.07 | 7.68 |
| E (Young's Modulus, Mpsi) | 11.039 | 11.31 |
| G (Shear Modulus, Mpsi) | 4.73 | 4.71 |
| Poisson's Ratio | 0.205 | 0.202 |
| E (Young's Modulus, GPa) | 76.1 | 78.0 |
| G (Shear Modulus, GPa) | 32.6 | 32.5 |
| BBV Strain Point (° C.) | 461 | 469.7 |
| BBV Anneal Point (° C.) | 503.4 | 513.4 |
| PPV Softening Point (° C.) | 715.2 | 741.4 |

Properties as a function of fictive temperature

| Time (hr) | 21 | 24.2 |
|---|---|---|
| Temperature (° C.) | 503 | 513 |
| E (Young's Modulus, Mpsi) | | 11.28 |
| G (Shear Modulus, Mpsi) | | 4.7 |

TABLE 2-continued

| | | |
|---|---|---|
| Poisson's Ratio | | 0.201 |
| E (Young's Modulus, GPa) | | 77.77 |
| G (Shear Modulus, GPa) | | 32.41 |
| Refractive Index | 1.5072 | 1.5050 |
| Refractive Index (2 * stdev) | 0.0003 | 0.0001 |
| Density (g/cm$^3$) | 2.405 | 2.431 |
| Time (hr) | 143 | 190 |
| Temperature (° C.) | 461 | 470 |
| E (Young's Modulus, Mpsi) | | 11.42 |
| G (Shear Modulus, Mpsi) | | 4.74 |
| Poisson's Ratio | | 0.204 |
| E (Young's Modulus, GPa) | | 78.74 |
| G (Shear Modulus, GPa) | | 32.68 |
| Refractive Index | 1.5082 | 1.5057 |
| Refractive Index (2 * stdev) | 0.0003 | 0.0001 |
| Density (g/cm$^3$) | 2.409 | 2.400 |
| Changes in properties as a function of fictive temperature at strain and anneal points | | |
| Slope dE/dT (GPa/° C.) | | −0.022 |
| Slope dG/dT (GPa/° C.) | | −0.006 |

Figure 3:
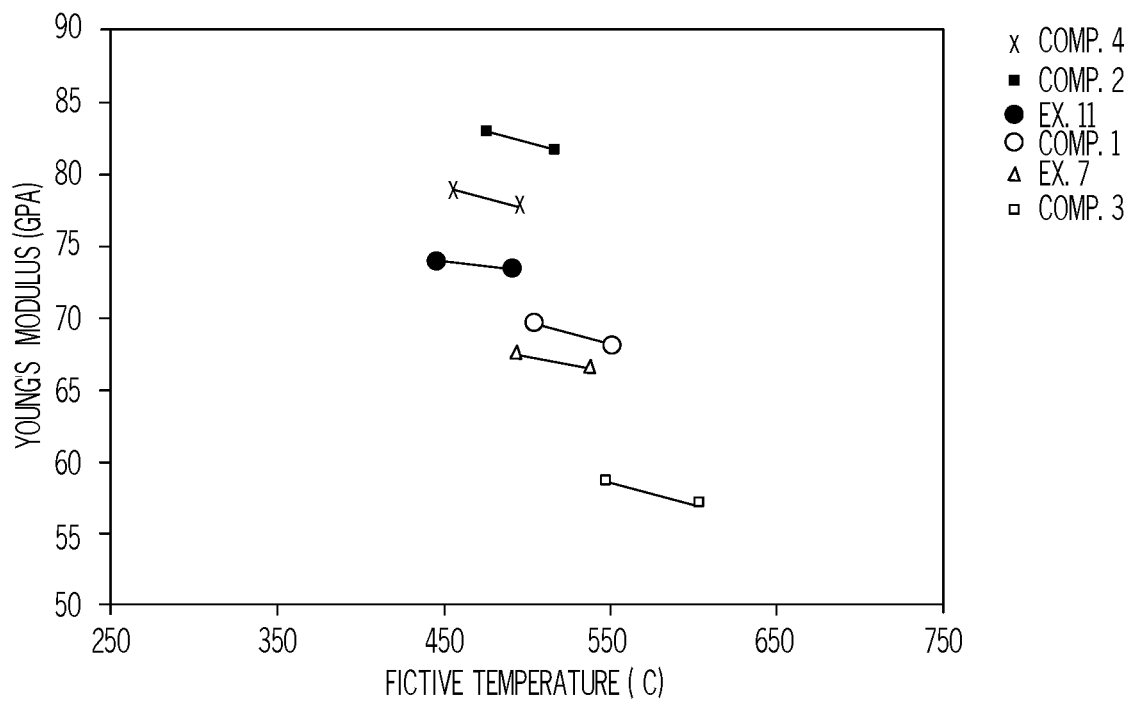
FIG. 3 graphically depicts the slope of Young's modulus versus fictive temperature of comparative examples and examples according to embodiments disclosed and described herein.

Tables 1 and 2 show analyzed compositions and properties of as-poured glasses as well as heat treated glasses as a function of the fictive temperature at the anneal and strain points. The anneal and strain points were measured via the beam bending viscosity method of ASTM C598-93 (2013). Fictive temperature was fixed by heat treating the glasses after the initial pour and anneal at the temperatures of the anneal and strain points. Heat treatment was conducted for considerably longer than the necessary times for structural relaxation of the glass to occur. The minimum heat treatment time is 30*viscosity of glass at heat treatment temperature/shear modulus. FIG. 3 shows Young's modulus vs. fictive temperature for $R_2O$—$Al_2O_3$—$SiO_2$ glasses demonstrating the mixed alkali effect on reducing Young's modulus vs. fictive temperature slopes. The glasses of Comparative Example 1, Comparative Example 2, and Comparative Example 3 have slopes of −0.0324, −0.0301 and −0.0227, respectively, whereas Comparative Example 4 has a slope of −0.0249 (or 17-23% lower slope), Example 7 has a slope of −0.018 (or about 19-44% lower slope), and Example 11 has a slope of −0.0128 (or about 44-60% lower slope). Table 3 below shows percent improvement in Young's modulus vs. fictive temperature slopes for $R_2O$—$Al_2O_3$—$SiO_2$ glasses shown in FIG. 3, demonstrating the mixed alkali effect on reducing Young's modulus vs. fictive temperature slopes.

As shown in Table 3 above, using mixed alkali metal oxides in glass compositions drives the slope of dE/dT closer to 0.000, and including larger alkali metal oxides, such as $Na_2O$ and $K_2O$ as compared to $Li_2O$, in the glass also drives the slope of dE/dT closer to 0.000.

Figure 4:
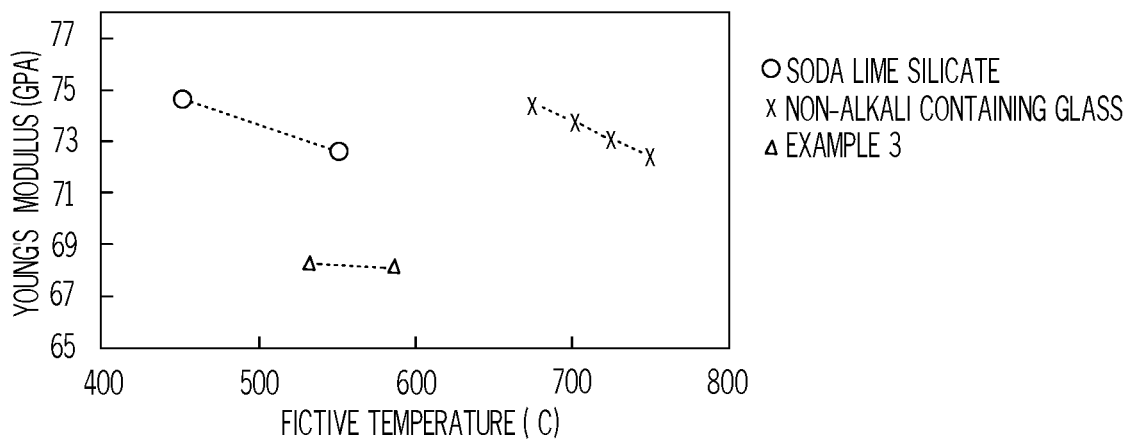
FIG. 4 graphically depicts the slope of Young's modulus versus fictive temperature of soda lime silicate, non-alkali-containing glass, and alkali-containing glass according to embodiments disclosed and described herein.

In addition, soda lime glasses and non-alkali-containing liquid crystal display glasses have slopes of −0.0200 and −0.0259, respectively, whereas the glass of Example 3 has a slope of −0.0040 (or 80-85% lower slope). FIG. 4 graphically depicts the Young's modulus v. temperature comparison of soda lime silicate, non-alkali-containing glasses, and the glass of Example 3.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such

TABLE 3

| | Example | | | | | |
|---|---|---|---|---|---|---|
| | Comp. 1 | Comp. 2 | Comp. 3 | Comp. 4 | 7 | 11 |
| alkali (batched mole %) | 20 Na$_2$O | 20 Li$_2$O | 20 K$_2$O | 10 Li$_2$O + 10 Na$_2$O | 10 Na$_2$O + 10 K$_2$O | 6.8 Li$_2$O + 6.8 Na$_2$O + 6.8 K$_2$O |
| Slope dE/dT | −0.030 | −0.032 | −0.023 | −0.025 | −0.018 | −0.013 |
| Percent improvement over Comp. 1 | | | | 17 | 39 | 57 |
| Percent improvement over Comp. 2 | | | | 23 | 44 | 60 |
| Percent improvement over Comp. 3 | | | | | 19 | 44 |

What is claimed is:

1. A glass composition comprising:
   greater than or equal to 69.0 mol % $SiO_2$;
   greater than or equal to 7.0 mol % $Al_2O_3$;
   greater than or equal to 14.0 mol % $R_2O$; and
   wherein the glass composition has an absolute value of a slope of a line extending between a first endpoint and a second endpoint less than or equal to |0.020|, wherein
   the first endpoint is a Young's modulus at a fictive temperature of an annealing point temperature and the second endpoint is a Young's modulus at a fictive temperature of a strain point temperature,
   the slope is a change in Young's modulus (GPa) per 1° C. change in fictive temperature, and
   $R_2O$ is a total amount of alkali metal oxides and comprises at least two alkali metal oxides.

2. The glass composition of claim 1, wherein $R_2O$ is greater than or equal to 18.0 mol %.

3. The glass composition of claim 1, wherein $R_2O$ comprises $K_2O$ in an amount from greater than or equal to 7.0 mol % to less than or equal to 11.0 mol %.

4. The glass composition of claim 1, wherein each of the at least two alkali metal oxides is present in the glass composition in an amount greater than or equal to 0.5 mol %.

5. The glass composition of claim 1, wherein $R_2O$ comprises $Na_2O$ and $Li_2O$, and a ratio of $Na_2O/Li_2O$ is greater than or equal to 1.0.

6. The glass composition of claim 1, wherein the $R_2O$ comprises $K_2O$ and $Na_2O$, and a ratio of $K_2O/Na_2O$ is greater than or equal to 1.0.

7. The glass composition of claim 1, wherein $R_2O$ comprises at least three alkali metal oxides.

8. The glass composition of claim 7, wherein each of the at least three alkali metal oxides is present in the glass composition in an amount greater than or equal to 0.5 mol %.

9. The glass composition of claim 7, wherein
   $R_2O$ comprises $Li_2O$, $Na_2O$, and $K_2O$,
   a ratio of $K_2O/Li_2O$ is greater than or equal to 1.0, and
   a ratio of $K_2O/Na_2O$ is greater than or equal to 1.0.

10. The glass composition of claim 9, wherein the ratio of $K_2O/Li_2O$ is greater than or equal to 5.0.

11. The glass composition of claim 1, wherein the glass composition comprises greater than or equal to 72.0 mol % $SiO_2$.

12. The glass composition of claim 1, wherein $SiO_2+Al_2O_3$ is greater than 80.0 mol %.

13. The glass composition of claim 1, comprising:
    greater than or equal to 9.5 mol % $Al_2O_3$; and
    less than or equal to 8.0 mol % $Li_2O$.

14. The glass composition of claim 1, wherein the glass composition comprises:
    from greater than or equal to 70.0 mol % to less than or equal to 75.0 mol % $SiO_2$; and
    from greater than or equal to 8.0 mol % to less than or equal to 12.0 mol % $Al_2O_3$,
    wherein $R_2O$ is greater than or equal to 16.0 mol %.

15. The glass composition of claim 1, wherein the glass composition comprises:
    from greater than or equal to 70.0 mol % to less than or equal to 75.0 mol % $SiO_2$; and
    from greater than or equal to 8.0 mol % to less than or equal to 12.0 mol % $Al_2O_3$, wherein
    $R_2O$ comprises $Li_2O$ and $Na_2O$, and
    $Li_2O+Na_2O$ is from greater than or equal to 14.0 mol % to less than or equal to 15.0 mol %.

16. The glass composition of claim 1, wherein the glass composition comprises:
    from greater than or equal to 70.0 mol % to less than or equal to 75.0 mol % $SiO_2$; and
    from greater than or equal to 8.0 mol % to less than or equal to 12.0 mol % $Al_2O_3$, wherein
    $R_2O$ comprises $Na_2O$ and $K_2O$, and
    $Na_2O+K_2O$ is from greater than or equal to 15.0 mol % to less than or equal to 21.0 mol %.

17. The glass composition of claim 1, wherein the glass composition comprises:
    from greater than or equal to 70.0 mol % to less than or equal to 75.0 mol % $SiO_2$; and
    from greater than or equal to 8.0 mol % to less than or equal to 12.0 mol % $Al_2O_3$, wherein
    $R_2O$ comprises $Li_2O$, $Na_2O$, and $K_2O$, and
    $Li_2O+Na_2O+K_2O$ is from greater than or equal to 15.0 mol % to less than or equal to 21.0 mol %.

18. The glass composition of claim 1, wherein the absolute value of the slope is less than or equal to |0.015|.

19. The glass composition of claim 1, wherein the absolute value of the slope is less than or equal to |0.010|.

20. A glass article formed from the glass composition of claim 1, comprising:
    a first surface;
    a second surface;
    a central region positioned between the first surface and the second surface; and
    a compressive stress layer extending from at least one of the first surface and the second surface into the central region of the glass article.

21. A consumer electronic product, comprising:
    a housing comprising a front surface, a back surface and side surfaces;
    electrical components at least partially within the housing, the electrical components comprising at least a controller, a memory, and a display, the display at or adjacent the front surface of the housing; and
    a cover substrate disposed over the display,
    wherein at least a portion of the housing or the cover substrate comprises the glass article of claim 20.

* * * * *